United States Patent
Matsumura et al.

(10) Patent No.: US 8,792,851 B2
(45) Date of Patent: Jul. 29, 2014

(54) FEMTO BASE STATION, ENERGY-SAVING COORDINATION NODE, WIRELESS COMMUNICATION SYSTEM AND COMPUTER PROGRAM

(75) Inventors: Takeshi Matsumura, Kawasaki (JP); Hideshi Murai, Zushi (JP); Toshikane Oda, Setagaya-ku (JP)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 188 days.

(21) Appl. No.: 13/521,953

(22) PCT Filed: Feb. 17, 2010

(86) PCT No.: PCT/JP2010/052806
§ 371 (c)(1),
(2), (4) Date: Jul. 12, 2012

(87) PCT Pub. No.: WO2011/101998
PCT Pub. Date: Aug. 25, 2011

(65) Prior Publication Data
US 2012/0289178 A1 Nov. 15, 2012

(51) Int. Cl.
*H04W 52/02* (2009.01)
*H04W 84/04* (2009.01)
(52) U.S. Cl.
CPC ........ *H04W 52/0206* (2013.01); *H04W 84/045* (2013.01); *Y02B 60/50* (2013.01)
USPC ......................................................... 455/403
(58) Field of Classification Search
USPC ........................... 455/403, 561, 448, 405, 509
See application file for complete search history.

(56) References Cited

U.S. PATENT DOCUMENTS

| 2009/0253461 A1 | 10/2009 | Kuwahara |
| 2009/0285143 A1 | 11/2009 | Kwun et al. |
| 2010/0158050 A1* | 6/2010 | Yang .............................. 370/498 |

(Continued)

FOREIGN PATENT DOCUMENTS

| EP | 2 107 840 A2 | 10/2009 |
| JP | 2009-111624 A | 5/2009 |

(Continued)

OTHER PUBLICATIONS

International Search Report, Application No. PCT/JP2010/052806, Jun. 8, 2010.

(Continued)

*Primary Examiner* — Melody Mehrpour
(74) *Attorney, Agent, or Firm* — Myers Bigel Sibley & Sajovec, P.A.

(57) ABSTRACT

A Femto base station which is arranged to connect to a wireless communication network and to generate a first cell for providing a wireless communication service to at least one user equipment existing within a coverage area of the first cell, comprising a transceiver comprising a transmitter and a receiver for the wireless communication with the user equipment and a controller, wherein the controller determines whether the Femto base station has entered an energy-saving mode or not, the controller disables the operation of the transmitter when it is determined that the base station has entered the energy-saving mode, and when the receiver detects a data transmission from the user equipment to a macro base station after disabling the operation of the transmitter, the controller reconfigures the transmitter. The macro base station generates a second cell with a broader coverage than the first cell and including the first cell.

8 Claims, 8 Drawing Sheets

(56) References Cited

U.S. PATENT DOCUMENTS

| | | | |
|---|---|---|---|
| 2011/0077029 A1 | 3/2011 | Okuda | |
| 2011/0098041 A1* | 4/2011 | Tomita et al. | 455/434 |
| 2011/0124366 A1 | 5/2011 | Hosono | |
| 2011/0143762 A1* | 6/2011 | Zhang et al. | 455/450 |
| 2011/0170440 A1* | 7/2011 | Gaal et al. | 370/252 |
| 2011/0188480 A1* | 8/2011 | Takagi | 370/335 |
| 2012/0258724 A1* | 10/2012 | Kim et al. | 455/452.2 |
| 2012/0264470 A1* | 10/2012 | Bajj et al. | 455/509 |

FOREIGN PATENT DOCUMENTS

| | | |
|---|---|---|
| JP | 2009-253569 A | 10/2009 |
| WO | WO 2009/148164 A1 | 12/2009 |
| WO | WO 2009/150750 A1 | 12/2009 |
| WO | WO 2010/004639 A1 | 1/2010 |

OTHER PUBLICATIONS

Written Opinion of the International Searching Authority, Application No. PCT/JP2010/052806, Jun. 8, 2010.

International Preliminary Report on Patentability, Application No. PCT/JP2010/052806, Sep. 27, 2011.

Extended European Search Report, Application No. 10846133.6, dated Feb. 13, 2014, 12 pages.

"3$^{rd}$ Generation Partnership Project; Technical Specification Group Radio Access Network; Evolved Universal Terrestrial Radio Access (E-UTRA); Physical Channels and Modulation (Release 8)", 3GPP Standard; 3GPP TS 36.211, 3$^{rd}$ Generation Partnership Project (3GPP), Mobile Competence Centre; 650, Route Des Lucioles; F-06921 Sophia-Antipolis Cedex; France, No. V8.7.0, May 1, 2009, pp. 1-83, XP050377539, *paragraph [5.7.1]—paragraph [5.7.2]*.

\* cited by examiner

FEMTO BASE STATION, ENERGY-SAVING COORDINATION NODE, WIRELESS COMMUNICATION SYSTEM AND COMPUTER PROGRAM

TECHNICAL FIELD

The present invention relates to a Femto base station, a energy-saving coordination node in wireless communication network enabling an efficient switching of operational modes of the Femto base station between an energy-saving mode and a normal mode.

BACKGROUND

Recently, a home/residential base station called a "Femto base station (Femto-BS)" is proposed as a solution to the problem regarding a limited power reception level of a user equipment (UE) such as a mobile phone especially in remote areas and in residences. The Femto-BS generates a service area called as a Femto cell providing in-home mobility with maximum user data rates without loading a macro cell provided by macro base stations (macro-BSs).

A radius of the Femto cell is approximately 10 meters and the Femto-BS provides the indoor coverage of the macro-BSs within a residence. It also increases the capacity of the data transmission to and from the user equipment, when the entire residence is in the macro-BS's coverage.

The Femto-BS deployed at home usually has an idle period, for example, at night where the user of the Femto-BS is sleeping. If the Femto-BS enters an energy-saving mode (ES mode) from a normal operation mode to turn off a Downlink (DL) transmission from the Femto-BS to the UE connecting to the Femto cell for such a long period, it may save electricity at home. After the Femto-BS enters the ES mode and turns off the DL transmission, the end-user must turn it on manually using a mechanical switch of the Femto-BS or a near field communication (NFC), because a UE generally requires the DL common channels (DLCCH) from the base station before it initiates a call or data transmission through that base station. In addition, the UE may request to update software and its configuration or to download contents as a background operation while the UE itself is not used by the user overnight.

SUMMARY

Therefore, it is desirable to make it possible to switch from the ES mode to the normal mode without the user operation.

According to a first aspect of the invention, there is provided a Femto base station which is arranged to connect a wireless communication network and to generate a first cell for providing a wireless communication service to at least one user equipment existing in a coverage of the first cell. The Femto-base station comprises a transceiver comprising a transmitter and a receiver for the wireless communication with the user equipment, and a controller. The controller may determine whether the Femto base station enters an energy-saving mode or not. When the controller determines that the Femto base station enters the energy-saving mode, the controller may disable the operation of the transmitter. When the receiver detects a data transmission from the user equipment to a macro base station after disabling the operation of the transmitter, the controller may reconfigure the transmitter. Wherein the macro base station may be arranged to generate a second cell having a broader coverage than the first cell and including the first cell, for providing the wireless communication service to the user equipment.

According to a second aspect of the invention, there is provided an energy-saving coordination node for a wireless communication network, in which the energy-saving coordination node is arranged to support operations of a Femto base station which generates a first cell for providing a wireless communication service to at least one user equipment existing in a coverage of the first cell. The energy-saving coordination node comprises a receiver for receiving configuration information of a physical random access channel (PRACH) of a macro base station which generates a second cell having a broader coverage than the first cell and including the first cell, for providing the wireless communication service to the user equipment, and a transmitter for transmitting the configuration information to the Femto base station.

According to a third aspect of the invention, there is provided an energy-saving coordination node for a wireless communication network, in which the energy-saving coordination node is arranged to support operations of a Femto base station which generates a first cell for providing a wireless communication service to at least one user equipment existing in a coverage of the first cell. The energy-saving coordination node comprise a first receiver for receiving from the Femto base station of a notice that the Femto base station enters an energy-saving mode where a wireless transmission function of the Femto base station is disabled, a second receiver for receiving location information of the user equipment served by a macro base station from the macro base station which generates a second cell having a broader coverage than the first cell and including the first cell, for providing the wireless communication service to the user equipment, a controller for determining whether or not the user equipment can be served by the first cell based on the received location information, and a transmitter for transmitting a wake-up instruction to the Femto base station, when the controller determines that the user equipment can be served by the first cell.

According to a fourth aspect of the invention, there is provided a wireless communication system including a Femto base station, a macro base station and an energy-saving coordination node. In the system, the Femto base station may be arranged to generate a first cell for providing a wireless communication service to at least one user equipment existing in a coverage of the first cell. The Femto base station comprises a transceiver comprising a transmitter and a receiver for the wireless communication with the user equipment, a network interface for communicating with the energy-saving coordination node, and a controller. The controller may determine whether the Femto base station enters an energy-saving mode or not. When the controller determines that the Femto base station enters the energy-saving mode, the controller disables the operation of the transmitter in the transceiver. The network interface may receive configuration information of a physical random access channel (PRACH) of the macro base station. When the receiver which is reconfigured using the configuration information detects data transmission from the user equipment to the macro base station after disabling the operation of the transmitter, the controller may reconfigure the transmitter. In the system, the macro base station may be arranged to generate a second cell having a broader coverage than the first cell and including the first cell, for providing the wireless communication service to the user equipment and to transmit the configuration information to the energy-saving coordination node. In the system, the energy-saving coordination node comprises a receiver for receiving the configuration information from the macro base station, and a transmitter transmitting the configuration information to the Femto base station.

According to a fifth aspect of the invention, there is provided a wireless communication system including a Femto base station, a macro base station and an energy-saving coordination node. In the system, the Femto base station may be arranged to generate a first cell for providing a wireless communication service to at least one user equipment existing in a coverage of the first cell. The Femto base station comprises a transceiver comprising a transmitter and a receiver for the wireless communication with the user equipment, a network interface for communicating with the energy-saving coordination node, and a controller. The controller may determine whether the Femto base station enters an energy-saving mode or not. When the controller determines that the Femto base station enters the energy-saving mode, the controller may disable the operation of the transmitter in the transceiver. The network interface may transmit the notice of entering of the energy-saving mode to the energy-saving coordination node. When the receiver receives a wake-up instruction from the energy-saving coordination node, the controller may reconfigure the transmitter. In the system, the macro base station is arranged to generate a second cell having a broader coverage than the first cell and including the first cell, for providing the wireless communication service to the user equipment and to transmit location information of the user equipment in the second cell to the energy-saving coordination node. In the system, the energy-saving coordination node comprises a first receiver for receiving from the Femto base station of the notice, a second receiver for receiving the location information, a controller for determining whether or not the user equipment in the second cell can be served by the first cell based on the received location information, and a transmitter for transmitting a wake-up instruction to the Femto base station, when the controller determines that the user equipment can be served by the first cell.

According to a sixth aspect of the invention, there is provided a computer program which causes a computer to function as a Femto base station which generates a first cell for providing a wireless communication service to at least one user equipment existing in a coverage of the first cell. The Femto base station comprises a transceiver comprising a transmitter and a receiver for the wireless communication with the user equipment and a controller. The controller may determine whether the Femto base station enters an energy-saving mode or not. When the controller determines that the Femto base station enters the energy-saving mode, the controller may disable the operation of the transmitter. When the receiver detects a data transmission from the user equipment to a macro base station after disabling the operation of the transmitter, the controller may reconfigure the transmitter. Wherein the macro base station may be arranged to generate a second cell having a broader coverage than the first cell and including the first cell, for providing the wireless communication service to the user equipment.

DETAILED DESCRIPTION

Embodiments of the present invention will now be described with reference to the attached drawings. Each embodiment described below will be helpful in understanding a variety of concepts from the generic to the more specific.

It should be noted that the technical scope of the present invention is defined by claims, and is not limited by each embodiment described below. In addition, not all combinations of the features described in the embodiments are always indispensable for the present invention.

Figure 1:
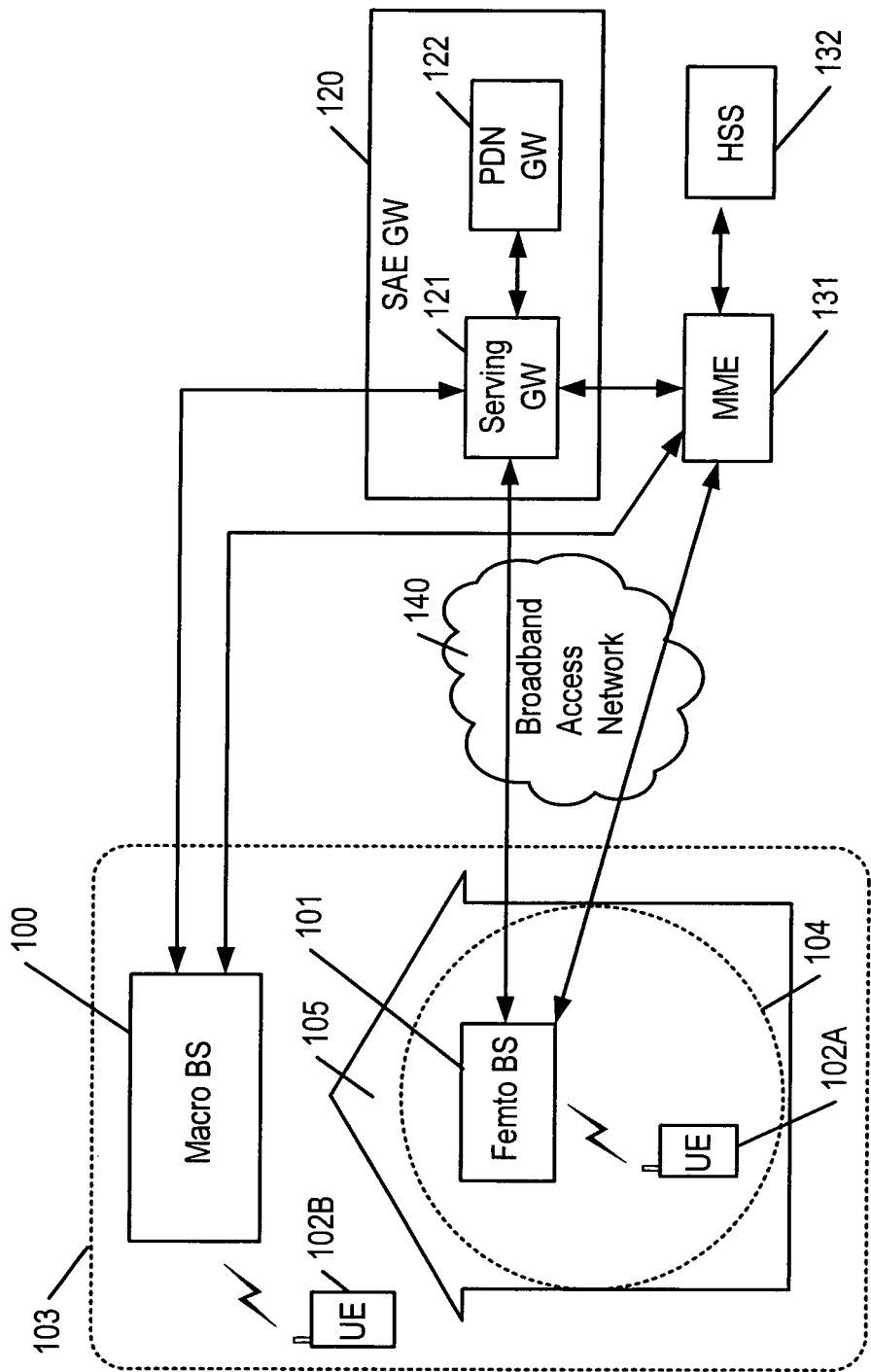
FIG. 1 shows a wireless communications network according to an exemplary embodiment of the invention.

FIG. 1 shows a wireless communication network according to an exemplary embodiment of the invention. It is a network which is generally in accordance with the Long Term Evolution (LTE) proposals of the Third Generation Partnership Project (3GPP). For further implementation details, the contents of the 3GPP Technical Specification (TS) 23.401, available from http://www.3gpp.org/ are expressly incorporated herein by reference.

FIG. 1 shows a macro-BS 100 which generates a macro cell 103 for providing a wireless communication service to a plurality of user equipments including a UE 102B. The UE 102B is located within the coverage of the macro cell 103. A Femto-BS 101 is located in a residence 105 to provide the UE 102A within the residence with the wireless communication service as well as the macro-BS 100. The Femto cell 104 generated by the Femto-BS 101 is within the coverage of the macro cell 103.

The UE 102 is a user equipment for communicating with other UEs over the wireless communication link according to a wireless communication protocol such as ANSI-136, GSM (Global Standard for Mobile) communication, GPRS (General Packet Radio Service), EDGE (Enhanced Data Rates for GSM Evolution), Code Division Multiple Access (CDMA), Wideband Code Division Multiple Access (WCDMA), CDMA2000, Long Term Evolution (LTE) and UMTS (Universal Mobile Telecommunications System). The UE 102 may be a mobile phone or other portable communication device which can communicate over the mobile communications network.

The macro-BS 100 connects to a system architecture evolution gateway (SAE GW) 120 and a mobility management entity (MME) 131. The Femto-BS 101 connects to the SAE GW 120 and the MME 131 via a broadband access network 140 or a dedicated line. The SAE GW 120 includes a serving gateway (serving GW) 121 and a packet data network gateway (PDN GW) 122. The MME can be function as an energy-saving coordination node according to the present invention. The MME connects to HSS 132. The HSS is a database for managing subscriber information of the UE 102 and information regarding the Femto-BS 101. Detailed structure of the core network corresponds to the Long Term Evolution (LTE) and System Architecture Evolution (SAE) proposals of the Third Generation Partnership Project (3GPP). Indeed, for further implementation details, the contents of the 3GPP Technical Specification (TS) 23.401 are available.

Figure 2:
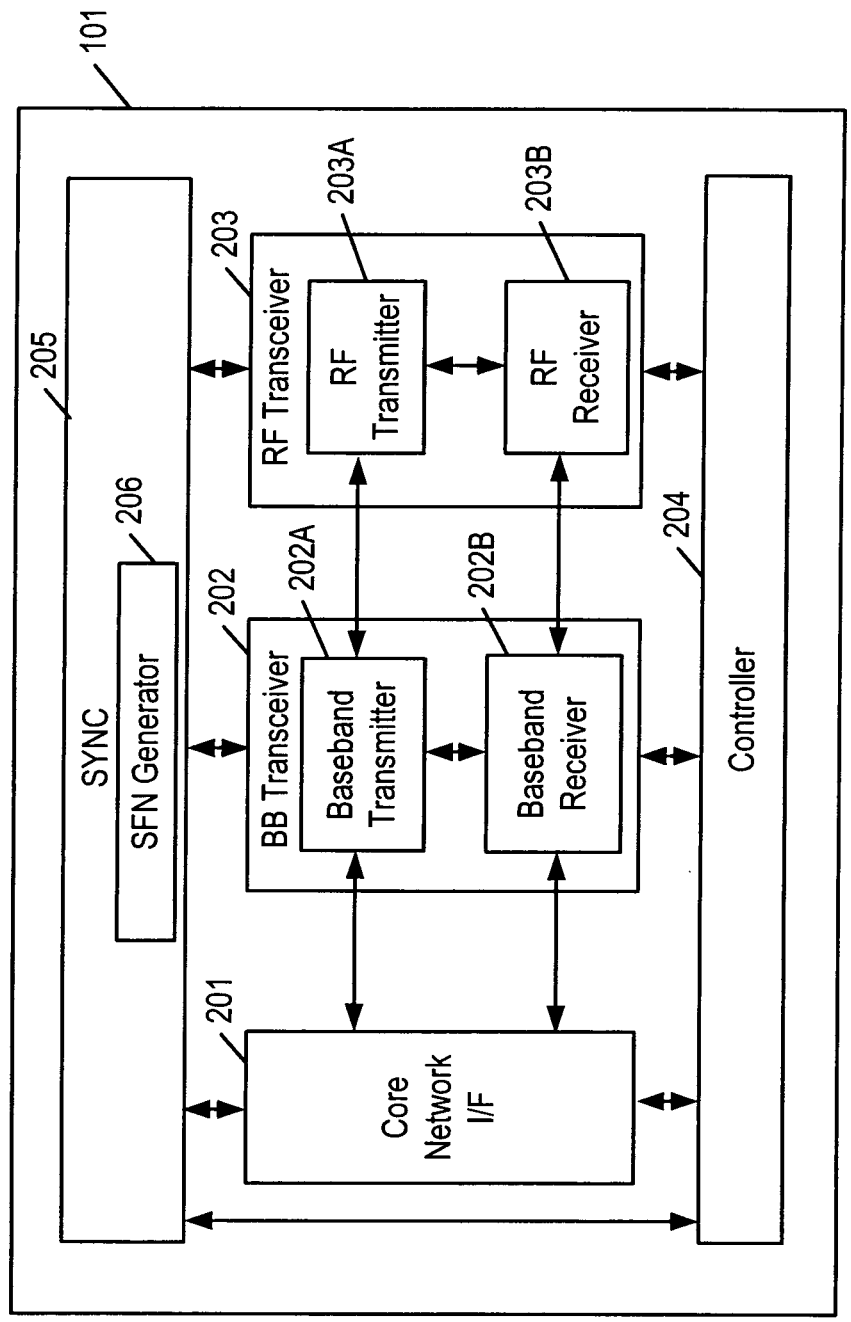
FIG. 2 illustrates an exemplary functional block diagram of the Femto-BS 101 according to the embodiment of the present invention.

FIG. 2 illustrates an exemplary functional block diagram of the Femto-BS 101 according to the embodiment of the present invention. The Femto-BS 101 includes a core network interface (I/F) 201, a baseband (BB) transceiver 202, a radio frequency (RF) transceiver 203, a controller 204 and a synchronization unit 205. The core network interface 201 is an interface for communicating with a core network of the wireless communication system including the SAE GW 120 and the MME 131. The BB transceiver includes a baseband transmitter 202A and a baseband receiver 202B. The baseband transmitter 202A executes processing including encoding of downlink data to be transmitted in RF frames and timing information, and provides the processing results with the RF transmitter 203A. The baseband receiver 202B receives uplink data from RF receiver 203B and decodes them to provide the core network interface 201. The baseband receiver 202B checks whether or not the decoded uplink data is a physical random access channel (PRACH) preamble transmitted from the UE 102A, if so, the baseband receiver informs to the controller 204 that the PRACH preamble is detected.

The RF transmitter 203A receives data from the baseband transmitter 202A and executes processing including D/A conversion, frequency conversion and amplification. The RF transmitter 203A wirelessly transmits the processing results to the UE 102. The RF receiver 203B receives uplink data from the UE 102 and executes processing including A/D conversion, frequency conversion and amplification. The RF receiver 203B transmits the processing results to the baseband receiver 202B.

The core network I/F 201 receives downlink data from the SAE GW 120 or the MME 131, executes protocol conversion to the downlink data and provides the conversion result to the baseband transmitter 202A. The core network I/F 201 also receives the uplink data from the baseband receiver 202B and transmits it to the SAE GW 120 or the MME 131 after the protocol conversion. When the core network I/F 201 receives a control signal for the base station, it provides the control signal to the controller 204 after the protocol conversion. The core network I/F 201 forwards a response to the control signal from the controller 204 to the core network.

The controller 204 controls operations of the core network I/F 201, the BB transceiver 202, the RF transceiver 203 and the synchronization unit 205 according to the control signal received from the core network. According to the exemplary embodiment of the present invention, the controller 204 controls an operation mode of the Femto-BS 101 including the energy-saving mode (ES mode) and normal mode. In order to shift to the ES mode from the normal mode, the controller 204 instructs the baseband transmitter 202A and the RF transmitter 203A to stop their operation. During the ES mode, when the baseband receiver 202B detects the PRACH preamble from the UE 102A and informs the detection to the controller 204, the controller 204 reconfigures the baseband transmitter 202A and the RF transmitter 203 to restart their operation to shift to the normal mode from the ES mode.

The synchronization unit 205 creates a clock signal as a reference signal for respective operations in the core network I/F 201, the BB transceiver 202, the RF transceiver 203 and the controller 204. The synchronization unit synchronizes an internal clock of the Femto-BS 101 to an external clock, such as the one from the core network or GPS. The synchronization unit 205 includes a system frame number (SFN) generator 206. The SFN generator 206 manages a timing for generating frames, used in communication with the UE 102, to which the system frame numbers are respectively assigned.

Figure 3:
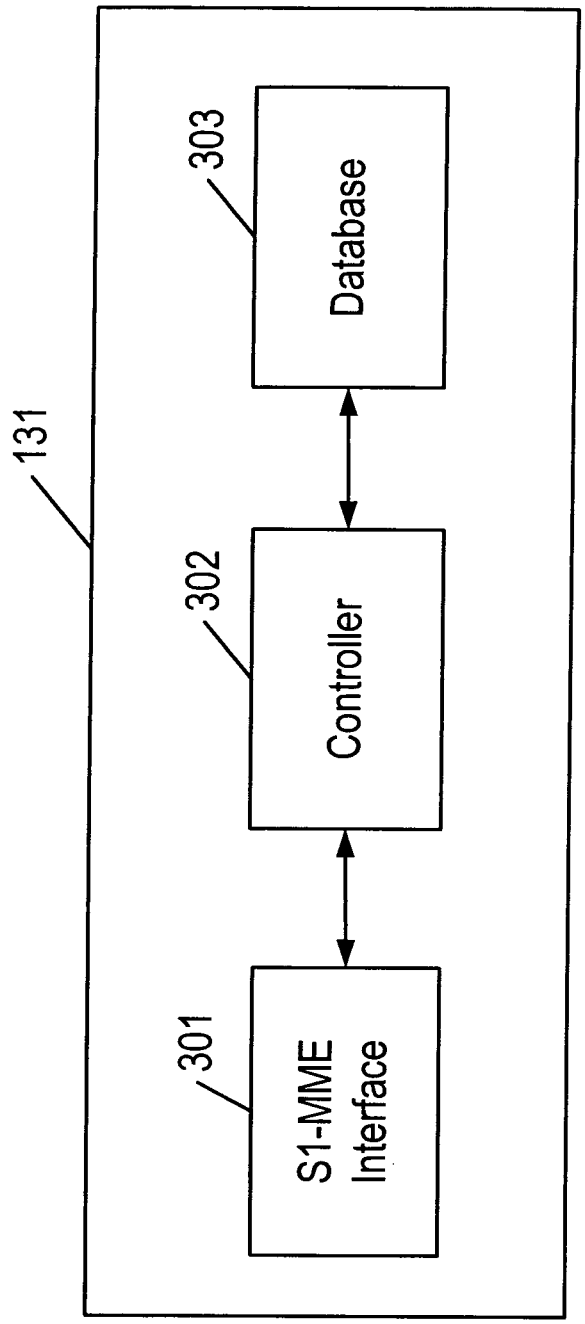
FIG. 3 illustrates an exemplary functional block diagram of MME 131 according to the embodiment of the present invention.

FIG. 3 illustrates an exemplary functional block diagram of the MME 131 according to the embodiment of the present invention. The MME 131 includes an S1-MME interface 301, a controller 302 and a database 303. The S1-MME interface 301 is an interface for communicating with the Femto-BS 101 via the broadband access network 140 and with the macro BS 100. S1-MME may interface 301 with the Femto-BS 101 via a dedicated line. The controller 302 controls operation of the MME 131 and executes processing according to the embodiments of the present invention. For more detailed structure of the interfaces correspond to the LTE/SAE proposals of the Third Generation Partnership Project (3GPP). Indeed, for further implementation details, the contents of the 3GPP Technical Specification (TS) 23.401 are available. The Database 303 may store in part or whole of information stored in the HSS 132 for the embodiment of the present invention.

Figure 4:
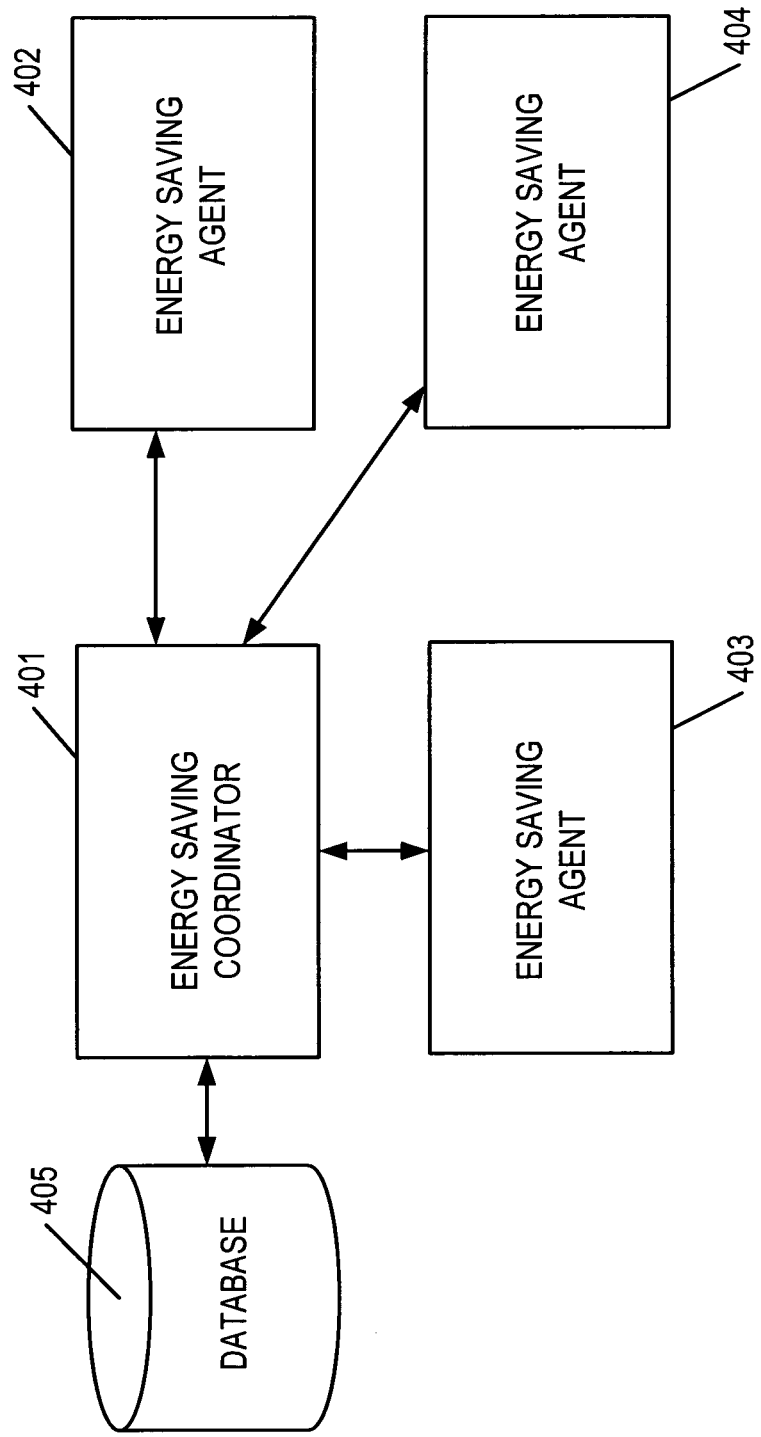
FIG. 4 shows the functional components to achieve the exemplary embodiment of the present invention.

FIG. 4 shows the functional components to achieve the exemplary embodiment of the present invention. An Energy-Saving (ES) Coordinator 401 communicates with multiple Energy-Saving (ES) Agents 402 to 404. The ES Coordinator 401 uses a database 405 to manage information regarding the Femto-BS 101 which is in the cell range of any one of macro-BSs 100 and the status of respective Femto-BSs 101 being in the ES mode. Information used to identify the macro-BS 100 which covers the Femto-BS 101 may be provisioned by the operator or by the end user to the ES Coordinator 401 by measuring and/or calculating the propagation delay (PD). According to one embodiment of the present invention, it also manages the information relating to the PRACH configuration that needs to be shared between the macro-BS 100 and the Femto-BS 101. The ES Agent 402 puts the hardware into the ES mode and wakes it up either autonomously or by the instruction from the ES Coordinator 401. In the exemplary embodiment of the present invention, the system depicted in FIG. 4 can be applied to the Long Term Evolution (LTE) network shown in FIG. 1. Accordingly, the ES Coordinator 401 is deployed at the MME 131 as the energy-saving coordination node and the database 405 is deployed at HSS 132. The MME 131 talks with the ES Agents in the Femto-BS 101 over the S1-MME interface 301. The ES Coordinator 401 may also be deployed at the macro-BS 100 and may communicate with the ES Agents over the X2 interface.

Figure 5:
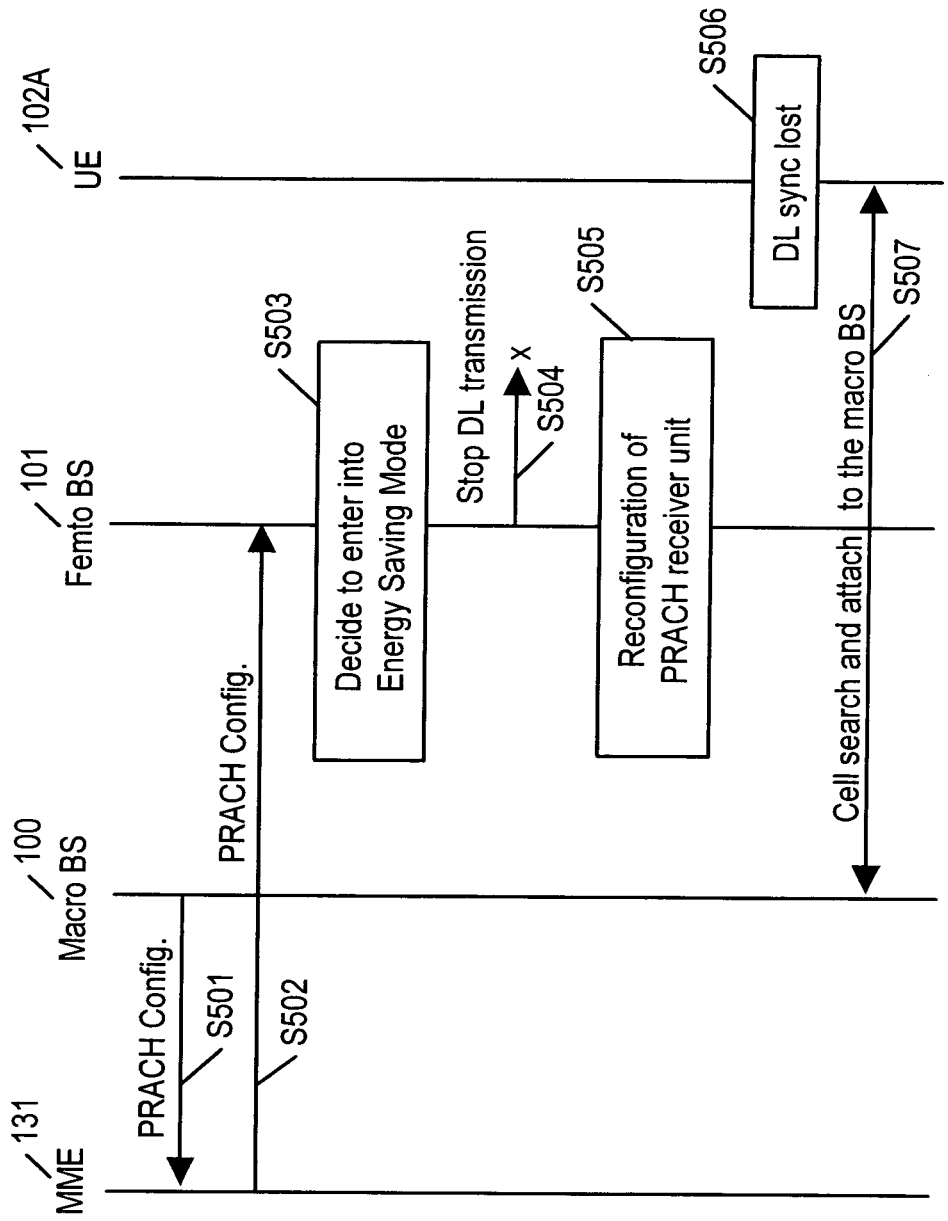
FIG. 5 shows an example of a sequence diagram illustrating a procedure according to the exemplary embodiment of the present invention, when the Femto-BS 101 enters the ES mode.

FIG. 5 shows an example of a sequence diagram illustrating a procedure according to the exemplary embodiment of the present invention, when the Femto-BS 101 enters the ES mode.

At S501, the macro-BS 100 transmits to the MME 131 as the ES Coordinator 401, configuration information including the PRACH configuration information of the macro-BS 100 and the SFN timing information necessary for the Femto-BS 101 to calculate the PRACH receiver window timing.

At S502, the Femto-BS 101 receives the configuration information from the MME 131. The received configuration information includes following elements.

Configuration of the PRACH in the macro-BS 100. The macro-BS 100 generates the PRACH configuration at every restart and informs the MME 131. The MME 131 as the ES Coordinator 401 updates the HSS 132 with the latest informed values. The PRACH configuration information includes index information of a preamble format of the PRACH according to the table 5.7.1-1 and PRACH configuration index according to the table 5.7.1-2. The tables are defined in "3GPP TS 36.211

V.9.0.0, 5.7 Physical random access channel, 5.7.1 Time and frequency structure". The PRACH configuration information further includes information to identify a set of possible sequences from which the UE 102A chooses contents of the PRACH preamble including RACH_ROOT_SEQUENCE which is a logical index to be used in generating a root Zadoff-Chu (ZC) sequence, $N_{CS}$ configuration which is an index used to determine a shift amount $N_{CS}$ in ZC sequence, High-speed-flag specifying whether to select the PRACH preamble within a limited group or not. The frequency information used in the macro-BS 100 may also be included in the configuration information.

SFN timing information (T0) when a system frame number (SFN) of a frame used in the macro-BS 100 becomes zero. The SFN timing information are used with the index information to set the PRACH receiving window by the controller 204 and the SFN generator 206 in order to receive the PRACH preamble transmitted from the UE 102A to the macro-BS 100 during the ES mode in the Femto-BS 101.

Propagation delay (PD) between the macro-BS 100 and the Femto-BS 101. As one way of provisioning the PD information to the MME 131, the network operator may calculate the propagation delay based on the distance between the macro-BS 100 and Femto-BS 101 on a map according to the address information of the owner of the Femto-BS 101. Another way may be to measure the propagation delay between the UE 102A and the macro-BS 100 in advance when the UE 102A is served by the Femto-BS 101, and to use the measured propagation delay as the PD information, since the distance between the Femto-BS 101 and the UE 102A can be ignored against the distance between the UE 102A and the macro-BS 100. At S503, the controller 204 of the Femto-BS 101 autonomously determines whether to enter the ES mode based on the monitored usage of itself or by an instruction from the core network. For example, it can go to the ES mode when there is no user using the Femto-BS 101 for a certain period, and the period may vary according to the time of the day, usage statistics learned by the Femto-BS 101 or provided from the network side, user related information like IMS presence and sensor data in the proximity of the Femto-BS 101. The period may even be zero which means the Femto-BS 101 immediately goes to the ES mode once the last UE 102A has released the radio bearer to and from the Femto-BS 101. The ES Coordinator 401 may provide the information of the UE's active cell, location and so on which the Femto-BS 101 may take into account. The behavior may take the user's preference in a configuration file into account.

At S504, if the controller 204 determines to go to the ES mode, it instructs the baseband transmitter 202A and the RF transmitter 203A to stop the operation in order to turn off the downlink transmission to the UE 102A.

At S505, the controller 204 reconfigures a PRACH receiver unit including the baseband receiver 202B, the RF receiver 203B and the SFN generator 206 using the configuration information downloaded from the MME 131 at S502.

During the reconfiguration, the controller 204 reconfigures the SFN Generator 206 to restart using the time information (T0) and the propagation delay (PD) between the macro-BS 100 and Femto-BS 101. For example, in case that the SFN cycle includes 4096 frames, the size of a single frame is 10 ms, the T0 is 12:34:00:000.567, the PD is 0.01 ms, and the current time is 12:44:00:000.890, the restart time (RT) of the SFN generator 206 may be calculated as follows:

$$RT = 12\!:\!34\!:\!00\!:\!000.567 + 4096 * 10\ ms * N - 0.01\ ms$$

Herein, N is a minimum integer which makes the RT larger than 12:34:00:000.890.

Next, the controller sets the PRACH receiving window by designating the system frame number and sub frame number based on the PRACH configuration index and the index of the preamble format received from the MME 131. For example, if the PRACH configuration index is "15" and the index of the preamble format is "0", according to the table 5.7.1-2 defined in "3GPP TS 36.211 V.9.0.0", the system frame number is set to "even" and the sub frame number is set to "9". The sub frame number is set as the number of a leading frame of the PRACH preamble and the length of the PRACH receiving window is set as 0.8 ms or 1.6 ms depending on the designated preamble format. In the LTE system, a single system frame includes 10 sub frames each having a frame length of 1 ms. The controller 204 sets the PRACH receiving window to the baseband receiver 202B and the reception frequency used in the macro-BS 100 to the RF receiver 203B.

Here, the propagation delay (Pb) from the UE 102A to the Femto-BS 101 can be regarded as zero as the distance between them is very short. Assuming that the light speed $c = 3*10^{\wedge}\ 8$ m/s, the cell radius of the Femto cell 104 is 12 m and the UE 102A is on the edge (i.e. distance (b)=12 m), the propagation delay $Pb = 12/(3*10^{\wedge}8) = 4*10^{\wedge}\ (-8) = 0.04$ us. On the other hand, the UL sampling rate in the LTE is fs=30.72 MHz, where the OFDM sub-carrier spacing is 15 kHz with FFT size 2048. Duration of one sample $Ts = 1/fs = \sim 0.03$ us. Thus, if the Femto-BS 101 puts the receiving window earlier by the propagation delay (PD) between the macro-BS and the Femto-BS than the receiving window of the macro-BS 100 in the time domain, the Femto-BS 101 can receive the PRACH preambles sent from the UE 102A to the macro-BS 100. Here, the delay of the preamble from the start of the receiving window can be called as the Time-Difference, and then the Time-Difference will be the same between the macro-BS and the Femto-BS.

At S505, the controller stores the original configuration of the PRACH receiver unit, including the original SFN timing information for the SFN generator 206, in cases in which the Femto-BS 101 recovers from the ES mode.

At S506, the UE 102A connecting to the Femto cell 104 loses the downlink synchronization to the Femto-BS 101 and at S507 because the downlink transmission has been paused at S504, the UE 102A executes a cell search and attaches to the macro cell 103 of the macro-BS 100.

Figure 6:
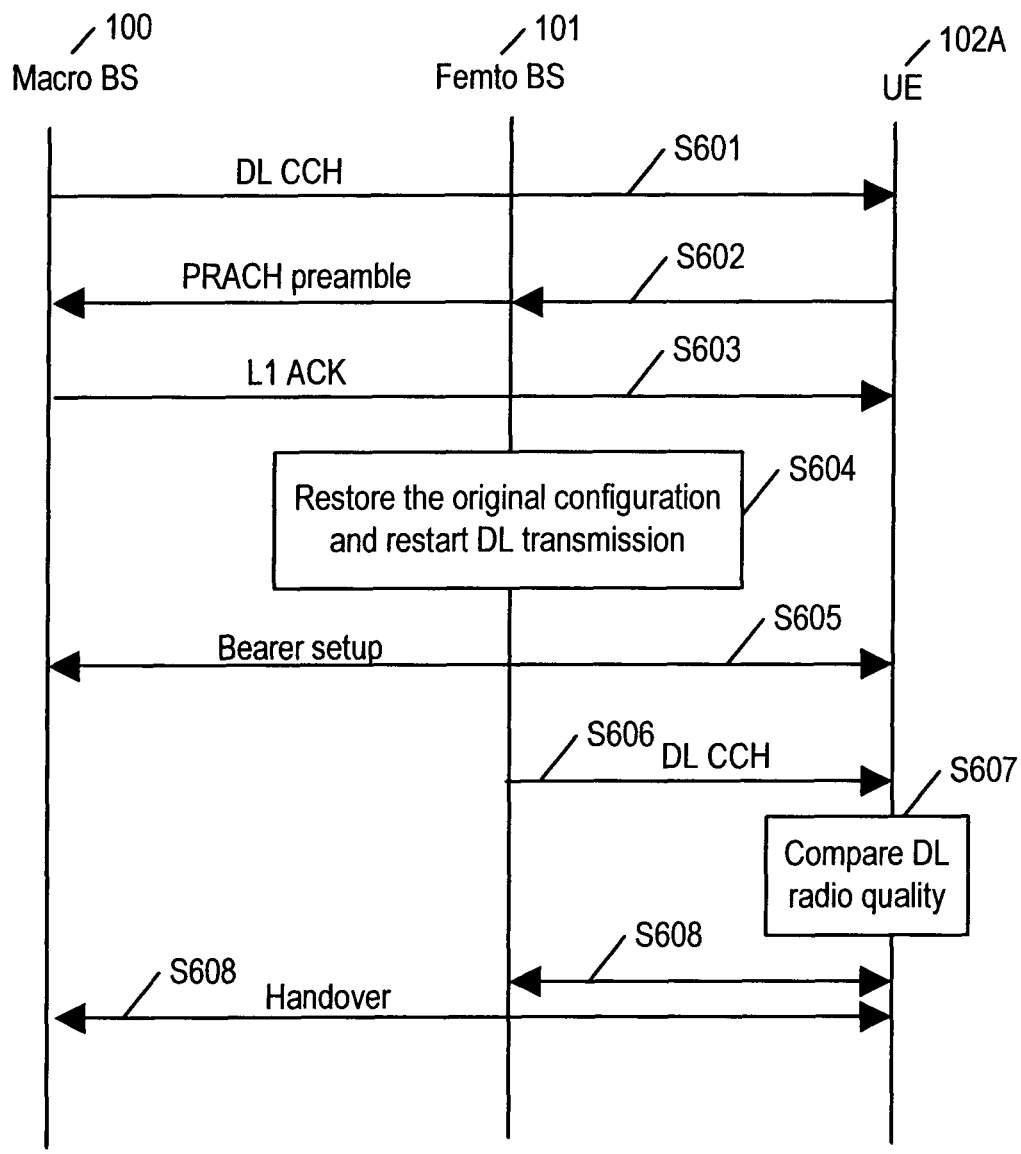
FIG. 6 shows an example of a sequence diagram illustrating a procedure according to the exemplary embodiment of the present invention.

FIG. 6 shows an example of a sequence diagram illustrating a procedure according to the exemplary embodiment of the present invention, when the Femto-BS 101 recovers from the ES mode. When the UE 102A within the coverage of the Femto cell 104 initiates a call or attempts to establish data connection, it carries out the random access procedure with the macro-BS 100. The UE 102A transmits a short signal called the PRACH preamble to initiate the procedure. The reconfigured PRACH receiver unit of the Femto-BS 101 tries to detect the PRACH preambles.

At S601, the macro-BS 100 transmits downlink common channels to the UE 102A, including, for example a physical channel of PBCH and/or PDSCH. When it is necessary for the UE 102A to access to the macro-BS 100, for example, when the UE 102A initiates a call, the UE 102A decodes the downlink common channels, obtains parameters needed for PRACH and transmits the PRACH preamble to the macro-BS 100 at S602. These steps corresponds to procedures defined in the respective 3GPP standards.

At S602, since the PRACH preamble transmission is carried over the designated system frame and the sub frame according to the PRACH configuration of the macro-BS 100, the Femto-BS 101 can detect it using the PRACH receiving window. The baseband receiver 202B decodes the uplink data and checks whether or not the decoded uplink data is the PRACH preamble from the UE 102A. The baseband receiver 202 converts the decoded uplink data taken in PRACH receiving window as the time-domain representation into the frequency-domain representation using an FFT. The output of the FFT, representing the received signal in the frequency domain, is multiplied with the complex-conjugate frequency-domain representation of the root ZC sequence and the result is fed through an IFFT. By observing the IFFT outputs, it is possible to detect which of the shifts of the 64 ZC root sequences has been applied to and its delay. Basically, a peak of the IFFT output in interval Ni corresponds to the Nith cyclically shifted sequence and the delay is given by the position of the peak within the interval. If the decoded uplink data is identified as the any one of the 64 ZC sequences, the baseband receiver 202B informs that the PRACH preamble is detected to the controller 204. In addition, the Femto-BS 101 checks if the PRACH preamble is sent from the UE 102A within the Femto cell 104 by looking at the position of the detected peak in the PRACH receiving window. If it is determined that it has come from outside of the coverage of the Femto cell 104, the Femto-BS 101 ignores the received PRACH preamble and remains in the ES mode. In order to determine whether the UE 102 is outside of the coverage of the Femto cell 104, the Baseband receiver may check a time difference between the reception timing of the PRACH preamble and the start point of the PRACH receiving window. If the time difference is larger than a predetermined threshold, it may be determined that the UE 102 locates outside of the Femto cell 104. Measurements defined in the 3GPP Technical Specification (TS) 36.214, "5.2.4 Timing advance" and "5.2.5 eNB Rx-Tx time difference" may be utilized to measure the time difference. When the Femto-BS 101 detects the PRACH preamble, the power information of the detected peak may be utilized together with the measured time difference of the PRACH preamble relative to the start of the PRACH receiving window to increase the determination accuracy. The UE calculates the initial power of the PRACH preamble by adding the downlink path loss estimate to a target power, so that the Macro-BS receives the preamble by the target power (PREAMBLE_RECEIVED_TARGET_POWER), according to 3GPP TS 36.213, section 6.1. As the distance between the macro-BS 100 and the Femto-BS 101 is provided to the Femto-BS 101 by the ES Coordinator 401 in advance, the path-loss from the UE 102A in the proximity of the Femto-BS 101 to the macro-BS 100 may be estimated by the Femto-BS 101. By informing the PREAMBLE_RECEIVED_TARGET_POWER at the macro-BS 100 to the Femto-BS 101, the Femto-BS 101 may estimate the initial transmission power of the PRACH preamble at the UE 102A. If the difference of the PRACH preamble power received by the Femto-BS 101 from the estimated UE's initial transmission power is larger than a predefined threshold, then the Femto-BS may regard the UE 102A is outside of its cell range.

In order to make the ES mode effective, when the Femto-BS 101 detects the PRACH preamble within a predetermined time period (for example, 5 minutes) after entering the ES mode, the Femto-BS 101 may ignore the detection and may not reconfigure the transmitters 202A and 203A.

At S603, the macro BS 100 transmits L1 ACK to the UE 102A in response to the PRACH preamble. At S604, the Femto-BS 101 recovers from the ES mode. The controller 204 restores the original configuration in the PRACH receiver unit including reconfiguration of the baseband transmitter 202A and the RF transmitter 203A to restart to DL transmission.

At S605, a bearer setup is executed between the macro-BS 100 and the UE 102A. At S606, the Femto-BS 101 restarts the downlink transmission. In response to the DL transmission restart, when the UE 102A detects the DL signal, at S607, the UE 102A measures strength and quality of the DL signal to determine whether to execute a handover from the macro-BS 100 to the Femto-BS 101. If the UE 102A determines that the DL signal from the Femto-BS 101 is better than the one from the macro-BS 100, it executes the handover at S608.

It should be noted that the random access procedure using the PRACH preamble is executed not only when a user initiates a call but also when the UE 102A is paged by the network. So the Femto-BS 101 at the ES mode does not need to monitor the paging channel to wake up at an incoming call attempt.

Figure 7:
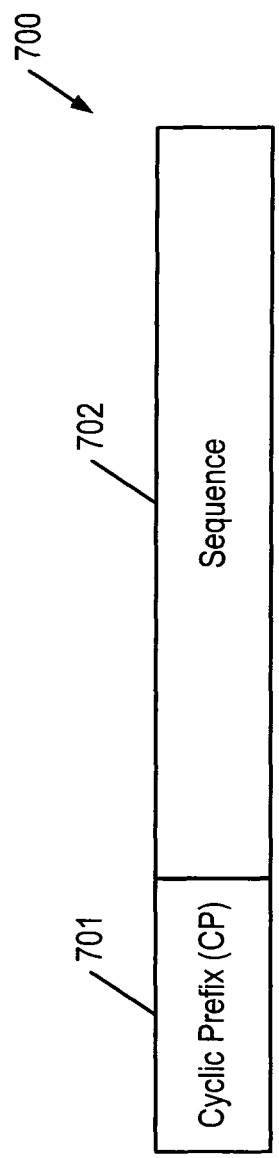
FIG. 7 shows an exemplary structure of the PRACH preamble according to "3GPP TS 36.211 V.9.0.0".

FIG. 7 shows an exemplary structure of the PRACH preamble according to "3GPP TS 36.211 V.9.0.0". The PRACH preamble 700 has a length of 1 ms, 2 ms or 3 ms according to the selected preamble format and consists of two parts including a Cyclic Prefix (CP) part 701 and a Sequence part 702. The Sequence part 702 involves a root ZC sequence which is shifted using $N_{CS}$ according to the table 5.7.2-2 defined in "3GPP TS 36.211 V.9.0.0, 5.7 Physical random access channel, 5.7.2 Preamble sequence generation". Since further details of the generation method of the PRACH preamble are described also in "3GPP TS 36.211 V.9.0.0, 5.7 Physical random access channel, 5.7.2 Preamble sequence generation", their explanation will be omitted in this embodiment.

In the above, embodiment of the present invention is described for such a case where the present invention is applied to the LTE system. In this type of applications, the time and the frequency information regarding the PRACH preamble is broadcasted to the UE 102. Such a UE 102 that wants to make a random access sends a preamble sequence within the specific time-frequency resource. The preamble sequence is selected at random from a set of 64 sequences that is broadcasted as well.

The present invention may be applied to W-CDMA system. According to 3GPP TS 25.213 section 4.3.3, the PRACH preamble in the W-CDMA is made by 256 repetitions of 16 symbols of a signature, which comes to 4096 chips length. There are 16 signatures that a UE can choose from. The preamble is scrambled by a scrambling code. There are 8192 preamble scrambling codes which are grouped into 512 groups of 16 codes. One group is assigned to a cell and broadcasted to the UE 102 in the cell. The UE 102 selects one of the 16 codes in the group when it initiates the PRACH procedure. Thus, there are 256 combinations from 16 signatures and 16 scrambling codes for the UE 102 to choose from. The UE 102 can select one of the 12 RACH sub-channels and send PRACH preambles on the selected sub-channel. According to 3GPP TS 25.211 Section 7, the timing of a RACH sub-channel is defined by a constant offset from the AICH access slot in the downlink. The AICH access slot is aligned to the PCCPCH timing which is aligned to the SFN timing. Thus, the Femto-BS 101 needs to align its SFN timing to the one in the macro cell, taking the propagation delay between the macro cell 103 and the Femto cell 104. Accordingly, the ES Coordinator 401 must provide the Femto-BS 101 with at least following parameters as the PRACH configuration of the macro-BS 100:

The frequency information and the SFN timing information of the macro cell;

The propagation delay (PD) from the Femto cell 104 to the macro cell 103;

The scrambling code group for the PRACH preamble in the macro cell.

In the embodiment of the present invention, the trigger which releases the Femto-BS 101 from the ES mode is not limited to the received PRACH preamble. In another embodiment of the present invention, the Femto-BS 101 recovers from the ES mode in response to a wake-up instruction from the network. In this embodiment, the MME 131 as the ES Coordinator 401 detects the location of the UE 102A trying to access the macro-BS 100 through the macro-BS 100 and wakes up the Femto-BS 101, if the UE 102A seems to be within the coverage of the Femto cell 104. In addition to the location information, the identities of the UE 102A may be utilized to determine which Femto-BS the UE 102A may want to wake up.

The information regarding which Femto-BS is in the cell range of which macro-BS needs to be provisioned to the database in advance, in the same way as the first embodiment. In addition, the information regarding which UE 102 has the right to use which Femto-BS may be provisioned in the database.

In this embodiment, when the Femto-BS 101 enters the ES mode, the Femto-BS 101 does not have to obtain PRACH configuration information from the network and to reconfigure the PRACH receiver unit. The Femto-BS 101 just turns off the downlink transmission for the connected UE 102A. The Femto-BS 101 notifies the ES Coordinator 401 of its transition into the ES mode. Possible conditions to go to the ES mode may be the same as ones described above in association with S503 of FIG. 5.

When the UE 102A executes the random access procedure through the coupled macro-BS 100, the ES Coordinator 401 looks up the Femto-BS 101 based on the location of the UE 102A and optionally using the identity of the UE 102A. If the looked-up Femto-BS 101 is in the ES mode, the network sends a signal to wake it up. The ES Coordinator 401 may wake other Femto-BSs up at the same time around the waked-up of the Femto-BS 101 to be prepared for hand-over between the Femto BSs.

Figure 8:
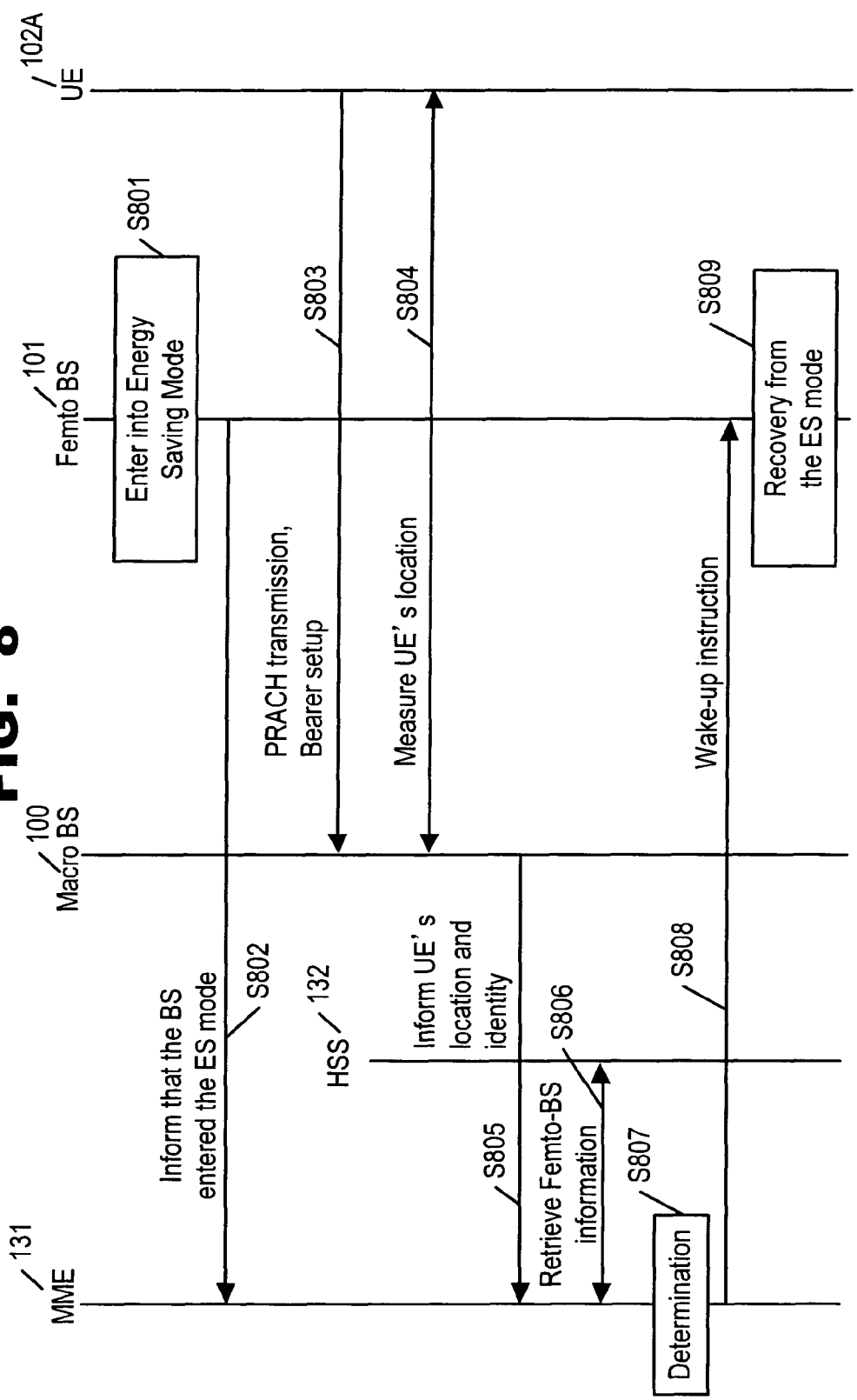
FIG. 8 shows another example of a sequence diagram illustrating a procedure according to the exemplary embodiment of the present invention, when the Femto-BS 101 recovers from the ES mode.

FIG. 8 shows another example of a sequence diagram illustrating a procedure according to the exemplary embodiment of the present invention, when the Femto-BS 101 recovers from the ES mode.

At S801, the Femto-BS 101 enters the ES mode, based on the determination result by the controller 204 of the Femto-BS 101. The controller 204 instructs the RF transmitter 203A and optionally the baseband transmitter 202A to stop the operation in order to turn off the downlink transmission for the UE 102A.

At S802, the Femto-BS 101 informs that the Femto-BS 101 has entered the ES mode to the MME 131 as the ES Coordinator 401. At S803, the UE 102A which needs to access to the macro-BS, transmits the PRACH preamble to the macro-BS 100. In response to the PRACH preamble transmission, the macro BS 100 transmits L1 ACK to the UE 102A and a bearer setup is executed between the macro-BS 100 and the UE 102A.

At S804, the macro-BS 101 measures the position of the UE 102A. The measurements may be executed using the GPS coordinate information received at the UE 102A and transferred to the macro-BS 100 from the UE 102A. The macro-BS may use a round trip time between the macro-BS 100 and the UE 102A.

At S805, the macro-BS 100 informs the location information and the identity of the UE 102A to the MME 131. In this embodiment, the identity of the UE may be MS-ISDN (Mobile Subscriber Integrated Services Digital Network Number), IMEI (International Mobile Equipment Identity), IMSI (International Mobile Subscriber Identity) or RNTI (Radio Network Temporary Identifier) but not limited to. At S806, MME 131 retrieves from the HSS 132 information regarding the Femto-BS 101 which is able to serve the UE 102A, the location information and the identity of that UE 102A have been informed from the macro-BS 100. The HSS 132 stores a table for managing respective Femto-BSs. The table can manage accessibility to Femto-BSs from UEs 102 by associating respective Femto-BSs with identities of the UEs which are permitted to use the corresponding Femto-BS. For example, the Femto-BS 101 in FIG. 1 is associated with the UE 102A in the table, while the Femto-BS 101 is not associated with the UE 102B. The table further manages the location information of respective Femto-BSs and the cell radius of its Femto cell. At S806, the MME 131 can retrieve from the table in HSS 132 information regarding the Femto-BS relating to the UE 102 informed by the macro-BS using the identity of the UE, since the identity of the UE is associated with the information of Femto-BS. In alternative embodiment the table in the HSS 132 may be stored in the database 303 in the MME 131, or it may be stored in an independent database.

At S807, MME 131 determines whether the UE 102A informed from the macro-BS 100 can be served by the Femto-BS 101 based on the location information of the UE 102, the location information of the Femto-BS 101 retrieved from the HSS 131 and the cell radius of the Femto cell. If the UE 102 is located within the coverage of the Femto-BS 101, the MME 131 sends a waking-up instruction to the Femto-BS at S808. However, in order to make the ES mode effective, even if the condition is satisfied to send the wake-up instruction, the MME 131 may not send the wake-up instruction in case where a predetermined time period (for example, 5 minutes) has not passed since the reception of the notice from the Femto-BS 101 at S802.

At S809, in response to the waking-up instruction from the MME 131, the Femto-BS 101 recovers from the ES mode by the controller 204 reconfiguring the RF transmitter 203A to restart the DL transmission.

In the above, the GPS coordinates are used as the location information of the UE 102 accessing the macro-BS 100 at S804, however, accuracy of the location information based on the GPS coordinates may not be sufficient in case where the UE 102 resides under a roof. On the other hand, at S806, the identity information of the UE 102 is used as a criteria to determine whether the Femto-BS 101 should wake up from the ES mode.

Therefore, the following further embodiment may be available based on the combination of the above described two embodiments. In this further embodiment, the Femto-BS 101 goes into the ES mode according to the S501 to S507 of FIG. 5, and the Femto-BS 101 notifies the MME 131 as the ES Coordinator of entering the ES mode. The PRACH preamble transmitted by the UE 102 (S602) is detected by the Femto-BS 101 in the same way as described in association with FIG. 6. However, the Femto-BS 101 starts a timer before executing S604. At S602, the PRACH preamble is detected by the macro BS 100 as well, which is followed by the S803 to S807 of FIG. 8. After the MME 131 determines that the UE 102 sent the PRACH preamble is permitted to access the Femto-BS 101 at S807, the MME 131 transmits the wake-up instruction to the Femto-BS at S808.

Then the Femto-BS 101 makes the final decision whether it recovers from the ES mode by taking the fact into account that the PRACH preamble was detected at the Femto-BS 101 as well. If the controller 204 of the Femto-BS 101 determines to wake up, then the steps S604 and thereafter continue. If the controller 204 determines not to wake up, or if the timer has elapsed before receiving the wake-up instruction, the Femto-BS 101 remains in the ES mode.

According to the above described embodiments, the present invention can decrease energy consumptions in the Femto-BS by turning off the DL transmission. This decrease interference between the Femto-BS and other BSs and/or other equipments in its proximity. The present invention does not require any extra operation by the end user to decrease the energy consumption of the Femto-BS, and does not affect background operations such as software and configuration updates and contents download to the UEs thanks to the autonomous recovery function from the ES mode according to each embodiment.

The Femto-BS may implement any one of the above described embodiments and switch among them depending on the environment such as the number of UEs in the proximity and the radio condition where the Femto-BS is located as well as other conditions like whether it is for private usage where the authorized users are known or it is for public usage where unknown UE may access. It should be noted that the present invention is not limited to the home use and the present invention may be applied to such a Femto-BS that locates in a public space.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A Femto base station which is arranged to connect to a wireless communication network and to generate a first cell for providing a wireless communication service to at least one user equipment existing in a coverage of the first cell, the Femto base station comprising:
   a transceiver comprising a transmitter and a receiver for the wireless communication with the user equipment;
   a controller; and
   a network interface for communicating with an energy-saving coordination node in the wireless communication network,
   wherein the controller determines whether the Femto base station enters an energy-saving mode or not,
   when the controller determines that the Femto base station enters the energy-saving mode, the controller disables the operation of the transmitter,
   when the receiver detects a data transmission of a physical random access channel (PRACH) preamble, from the user equipment to a macro base station after the controller has disabled the operation of the transmitter, the controller responds by enabling operation of the transmitter,
   wherein the macro base station is arranged to generate a second cell having a broader coverage than the first cell and including the first cell, for providing the wireless communication service to the user equipment,
   the network interface receives, from the energy-saving coordination node, configuration information of the PRACH preamble transmitted from the user equipment to the macro base station, in advance,
   the controller reconfigures the receiver based on the configuration information in response to the controller disabling the operation of the transmitter, and
   the reconfigured receiver detects the PRACH preamble.

2. The Femto base station according to claim 1, wherein the network interface receives a wake-up instruction from the energy-saving coordination node during the energy-saving mode,
   the controller reconfigures the transmitter in response to the reception of the wake-up instruction.

3. The Femto base station according to claim 1, wherein the configuration information includes at least detection information that is used by the controller for estimating a transmission timing of the PRACH preamble from the user equipment to the macro base station in order to detect the PRACH preamble and information to identify a set of possible sequences from which the user equipment chooses contents of the PRACH preamble.

4. The Femto base station according to claim 3, wherein the detection information includes information of the time when a system frame number (SFN) of a frame transmitted from the macro base station becomes zero, information of propagation delay between the macro base station and the Femto base station, first index information of a format of the PRACH preamble and second index information of the configuration of the PRACH preamble.

5. The Femto base station according to claim 4, further comprising an estimation unit for estimating a generation timing of a frame in the macro base station based on the information of the time and the propagation delay,
   wherein the controller identifies the system frame number of a frame for the PRACH preamble transmission from the user equipment and a sub frame number of a sub frame to be used as a leading frame for the PRACH preamble transmission, among a plurality of sub frames included in the frame for the PRACH preamble transmission, and
   the receiver detects the PRACH preamble by monitoring the communication between the user equipment and the macro base station using the estimated generation timing, the identified system frame number and the identified sub frame number, and the set of possible sequences.

6. The Femto base station according to claim 1, wherein when the receiver detects the data transmission within a predetermined time period after the disabling of the operation of the transmitter, the controller does not reconfigures the transmitter.

7. A wireless communication system comprising:
   a Femto base station;
   a macro base station; and
   an energy-saving coordination node, wherein
   the Femto base station is arranged to generate a first cell for providing a wireless communication service to at least one user equipment existing in a coverage of the first cell, comprising:
      a transceiver comprising a transmitter and a receiver for the wireless communication with the user equipment;
      a network interface for communicating with the energy-saving coordination node; and
      a controller,
      wherein the controller determines whether the Femto base station enters an energy-saving mode or not, when the controller determines that the Femto base station enters the energy-saving mode, the controller disables the operation of the transmitter in the transceiver, the network interface receives configuration information of a physical random access channel (PRACH) of the macro base station, and when the receiver which is reconfigured using the configuration information detects data transmission from the user equipment to the macro base station after the controller has disabled the operation of the transmitter, the controller responds by enabling operation of the transmitter, the macro base station is arranged to generate a second cell having a broader coverage than the first cell and including the first cell, for providing the wireless communication service to the user equipment and to transmit the configuration information to the energy-saving coordination node, and the energy-saving coordination node comprising:
 a receiver for receiving the configuration information from the macro base station; and
 a transmitter transmitting the configuration information to the Femto base station.

8. A computer program product comprising computer readable program code on a non-transitory computer readable medium, the computer readable program code executable by a computer to cause the computer to operate as a Femto base station which generates a first cell for providing a wireless communication service to at least one user equipment existing in a coverage of the first cell, the computer readable program code comprising:

computer readable program code that determines whether the Femto base station enters an energy-saving mode or not, computer readable program code that responds to a determination that the Femto base station is in the energy-saving mode by disabling operation of a transmitter of the Femto base station, and computer readable program code that responds to a receiver of the Femto base station detecting a data transmission of a physical random access channel (PRACH) preamble, from the user equipment to a macro base station after the operation of the transmitter has been disabled, by enabling operation of the transmitter, wherein the macro base station is arranged to generate a second cell having a broader coverage than the first cell and including the first cell, for providing the wireless communication service to the user equipment, computer readable program code that receives, from the energy-saving coordination node, configuration information of the PRACH preamble transmitted from the user equipment to the macro base station, in advance, and reconfigures the receiver based on the configuration information when the operation of the transmitter has been disabled, and computer readable program code that detects the PRACH preamble.

* * * * *

UNITED STATES PATENT AND TRADEMARK OFFICE
CERTIFICATE OF CORRECTION

PATENT NO. : 8,792,851 B2
APPLICATION NO. : 13/521953
DATED : July 29, 2014
INVENTOR(S) : Matsumura et al.

Page 1 of 1

It is certified that error appears in the above-identified patent and that said Letters Patent is hereby corrected as shown below:

In the Specification

In Column 1, Line 5, below Title, insert -- CROSS REFERENCE TO RELATED APPLICATION
This application is a 35 U.S.C. § 371 national stage application of PCT International
Application No. PCT/JP2010/052806, filed on 17 February 2010, the disclosure and content
of which is incorporated by reference herein in its entirety. The above-referenced PCT
International Application was published in the English language as International Publication
No. WO 2011/101998 A1 on 25 August 2011. --.

In Column 5, Line 60, delete "transmitter 203" and insert -- transmitter 203A --, therefor.

In Column 12, Line 35, delete "HSS 131" and insert -- HSS 132 --, therefor.

In Column 12, Line 59, delete "5507" and insert -- S507 --, therefor.

In Column 12, Line 66, delete "5803 to 5807" and insert -- S803 to S807 --, therefor.

Signed and Sealed this
Twelfth Day of May, 2015

Michelle K. Lee
*Director of the United States Patent and Trademark Office*